(12) United States Patent
Pichavant et al.

(10) Patent No.: US 10,659,147 B2
(45) Date of Patent: May 19, 2020

(54) REMOTE ASSISTANCE SYSTEM FOR AIRCRAFT

(71) Applicant: Airbus Operations (S.A.S.), Toulouse (FR)

(72) Inventors: Claude Pichavant, Toulouse (FR); Luc Emberger, Corronsac (FR); Fabrice Cotdeloup, Plaisance du Touch (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 16/286,113

(22) Filed: Feb. 26, 2019

(65) Prior Publication Data

US 2019/0273555 A1 Sep. 5, 2019

(30) Foreign Application Priority Data

Mar. 2, 2018 (FR) ...................................... 18 51830

(51) Int. Cl.
*H04B 7/185* (2006.01)
*G08G 5/00* (2006.01)

(52) U.S. Cl.
CPC ....... *H04B 7/18506* (2013.01); *G08G 5/0013* (2013.01); *H04B 7/18504* (2013.01)

(58) Field of Classification Search
CPC ............ H04B 7/18508; H04B 7/18506; H04B 7/18504; H04B 7/18502; H04B 1/3822; H04B 1/385; H04B 2001/3866; H04B 7/15507; H04B 7/1851; H04B 7/1858; H04W 84/06; H04W 84/005;

(Continued)

(56) References Cited

U.S. PATENT DOCUMENTS 6,643,509 B1 * 11/2003 Crow ................. H04B 7/18508
455/427
7,505,736 B2 * 3/2009 Min .................... H04B 7/18508
370/316

(Continued)

OTHER PUBLICATIONS

"Internet Protocol: DARPA Internet Program Protocol Specification," Jon Postel, ed., RFC: 791, 49 pages total, Sep. 1981. [Retrieved from https://tools.ietf.org/pdf/rfc791.pdf].

(Continued)

*Primary Examiner* — Golam Sorowar
(74) *Attorney, Agent, or Firm* — Jenkins, Wilson, Taylor & Hunt, P.A.

(57) ABSTRACT

A device for an aircraft having at least one first communication with an air traffic control center. The device establishes a second communication with a remote assistance center and performs a first mixing of audio signals from the first communication or communications and of audio signals from the second communication and transmits the result to the pilot. The device also performs a second mixing of audio signals from the first communication or communications and of audio signals from the pilot and transmits the result to the remote assistance center by using the second communication. The device performs a relaying of commands received via the second communication to devices of the aircraft. An operator in the remote assistance center listens to the exchanges between the pilot and the air traffic control center and can exchange with the pilot and relieve him or her of certain tasks.

9 Claims, 4 Drawing Sheets

(58) Field of Classification Search
CPC ..... H04W 24/02; H04W 36/14; H04W 36/32; H04W 4/023; H04W 4/10; H04W 4/14; H04W 72/0453; H04W 72/10; H04W 76/14; H04W 76/15; H04W 80/06; H04W 84/02; H04W 84/12
See application file for complete search history.

(56) References Cited

U.S. PATENT DOCUMENTS

| | | |
|---|---|---|
| 9,401,758 B2 | 7/2016 | Bosworth |
| 2003/0130770 A1 | 7/2003 | Matos |
| 2004/0008253 A1* | 1/2004 | Monroe ........... G08B 13/19641 348/143 |
| 2004/0128039 A1 | 7/2004 | Podowski |
| 2013/0346081 A1 | 12/2013 | Loubiere et al. |

OTHER PUBLICATIONS

French Search Report for Application No. 1851830 dated Nov. 21, 2018.

\* cited by examiner

US 10,659,147 B2

REMOTE ASSISTANCE SYSTEM FOR AIRCRAFT

CROSS-REFERENCE TO RELATED APPLICATION

This application claims priority to French patent application number 18 51830 filed on Mar. 2, 2018, the entire disclosure of which is incorporated by reference herein.

TECHNICAL FIELD

The disclosure herein relates to remote assistance for aircraft and relates more particularly to a remote assistance system for aircraft.

BACKGROUND

Currently, in an aircraft cockpit, tasks of managing communication with air traffic control centers (ATC) and/or with other aircraft are managed by a crew member. For that, several communication devices are generally available on board:
- at least two VHF (very high frequency) radios which are used for "voice" and/or "data" communications over short distances (of the order of 370 kilometers, or 200 nautical miles) in broadcasting mode. Three VHF radios are usually installed on board;
- at least one HF (high frequency) radio, which is used for "voice" and/or "data" communications over longer distances in broadcasting mode; and
- a satellite link, called SATCOM, which is used for "voice" and/or "data" communications over long distances in point-to-point mode.

These communication management tasks consist in or comprise configuring communication devices embedded in the aircraft in order to listen in to one or more frequencies or radio channels, and to answer calls from air traffic control centers ATC. The audio volume of each established "voice" communication must also be adjusted. Other tasks of configuring devices embedded in the aircraft can be assumed by the crew member responsible for the communication management tasks.

In conditions where the crew is reduced to a single pilot member in the cockpit, the latter may be subjected to an activity overload. For example, in case of weather conditions requiring a diversion, the pilot is forced to have to simultaneously manage the diversion of the aircraft, checking procedures, and tasks managing communication with the air traffic control centers ATC in order to obtain an authorization to divert to a new airport.

It is desirable to provide a solution which makes it possible to lighten the tasks performed in the cockpit, more particularly when the crew is reduced to a single pilot member in the cockpit.

SUMMARY

One object of the disclosure herein is a device to be embedded in an aircraft having at least one first communication with an air traffic control center, the cockpit of the aircraft being equipped with at least one loudspeaker and one microphone intended for the pilot of the aircraft, the device comprising: a communicator for establishing a second communication, with a remote assistance center; first mixer for performing a first mixing of audio signals originating from the first communication or communications and of audio signals originating from the second communication, and for transmitting the result of the first mixing to the at least one loudspeaker; second mixer for performing a second mixing of audio signals originating from the first communication or communications and of audio signals originating from the microphone, and for transmitting the result of the second mixing to the second communication; and a command relay for performing a relaying of commands received via the second communication to devices of the aircraft.

Thus, an operator posted in the remote assistance center hears, by virtue of the mixing of the audio signals, the exchanges between the pilot and the air traffic control center, can exchange with the pilot and relieve him or her of certain tasks by virtue of the remote commands.

According to an embodiment, the commands are at least from the following list of commands: adjust the sound level of the audio signals received from the air traffic control center; parameterize devices of the cockpit to establish one or more communications with the air traffic control center; parameterize devices of the cockpit to select in transmission and/or in reception one or more communications from a plurality of communications established with the air traffic control center; and accept a call received via a communication established with the air traffic control center.

According to an embodiment, the list of commands also comprises: commanding the opening and the closing of the door between the cockpit and the cabin of the aircraft.

According to an embodiment, the device also comprises an interface for receiving a remote assistance activation signal, and: in the presence of the remote assistance activation signal, an activator for activating at least the first and second mixings and the relaying of commands; and in the absence of the remote assistance activation signal, a propagator for transmitting the audio signals originating from the first communication or communications to the at least one loudspeaker and for transmitting the audio signals originating from the microphone to the first communication or communications.

According to an embodiment, the device also comprises an information relay for relaying to the second communication information on the status and configuration of devices of the aircraft and/or text messages exchanged between the cockpit and the air traffic control center.

According to an embodiment, the second communication is a satellite communication.

Another object of the disclosure herein is a system comprising a first remote assistance device as described above, and a second remote assistance device installed in the remote assistance center, the first and second remote assistance devices cooperating via the second communication in order to allow an operator posted in the remote assistance center to remotely control devices of the aircraft, to communicate by voice with the cockpit of the aircraft and to receive voice exchanges between the cockpit of the aircraft and the air traffic control center.

Another object of the disclosure herein is an aircraft having at least one first communication with an air traffic control center, the cockpit of the aircraft being equipped with at least one loudspeaker and one microphone intended for the pilot of the aircraft, the aircraft also comprising a device as described above.

Another object of the disclosure herein is a method implemented by a device embedded in an aircraft having at least one first communication with an air traffic control center, the cockpit of the aircraft being equipped with at least one loudspeaker and one microphone intended for the pilot of the aircraft. The method comprises the following steps: establishing a second communication, with a remote assistance center; performing a first mixing of audio signals originating from the first communication or communications and of audio signals originating from the second communication, and transmitting the result of the first mixing to the at least one loudspeaker; performing a second mixing of audio signals originating from the first communication or communications and of audio signals originating from the microphone, and transmitting the result of the second mixing to the second communication; and relaying of the commands received via the second communication to devices of the aircraft.

BRIEF DESCRIPTION OF THE DRAWINGS

The features of the disclosure herein mentioned above, and others, will become more clearly apparent on reading the following description of at least one embodiment, the description being given in relation to the attached, example drawings, in which.

DETAILED DESCRIPTION

Figure 1:
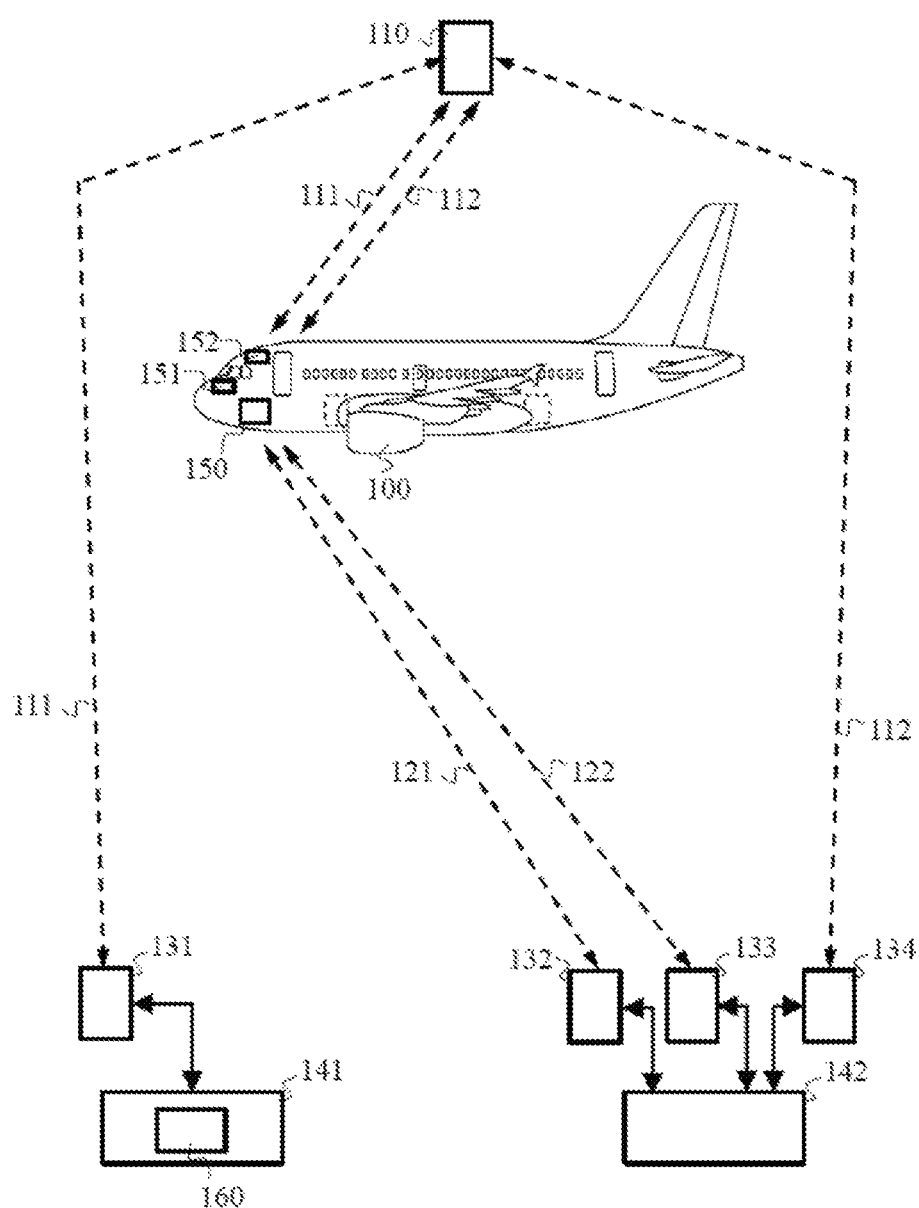
FIG. 1 schematically illustrates a communication system between an aircraft and sites on the ground.

FIG. 1 schematically illustrates a communication system between an aircraft 100 and sites on the ground 141, 142. The site 142 is an air traffic control center ATC and the site 141 is a remote assistance center.

The air traffic control center ATC 142 is equipped with, or connected to, at least one transceiver suitable for establishing, respectively, at least one communication with the aircraft 100. In FIG. 1, the air traffic control center ATC 142 is connected to three transceivers 132, 133, 134. For example, the transceiver 132 is adapted to perform VHF radio communications 121, the transceiver 133 is adapted to perform HF radio communications 122 and the transceiver 134 is adapted to perform satellite communications 112 via a satellite 110. Other communication technologies can be used to establish a communication between the air traffic control center ATC 142 and the aircraft 100.

The remote assistance center 141 is equipped with a communicator adapted or configured to establish a communication 111 with the aircraft 100. The communicator is at least one transceiver adapted to establish the communication 111 with the aircraft 100, or a communication interface connected to the at least one transceiver. The remote assistance center 141 is preferentially connected, via an IP (internet protocol, as described in the normative document RFC 791) network, to a satellite transceiver 131 adapted to perform satellite communications via the satellite 110 (or another satellite). That makes it possible to be detached from the position on the ground of the remote assistance center 141 relative to the actual position of the aircraft 100. Other communication technologies can be used to establish a communication between the remote assistance center 141 and the aircraft 100 and in particular any long distance communicator supporting the IP communication protocol.

Furthermore, the aircraft 100 embeds a first remote assistance device 150 and the remote assistance center 141 comprises a second remote assistance device 160, which cooperate so as to allow an operator posted in the remote assistance center 141 to assist the pilot of the aircraft 100 and more particularly to remotely control devices of the aircraft 100. This aspect is detailed hereinbelow in relation to FIGS. 2, 3 and 7.

Figure 2:
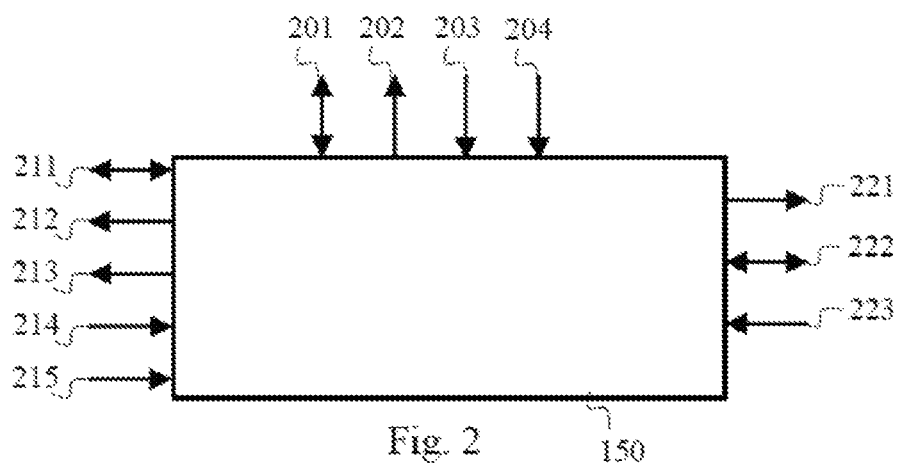
FIG. 2 schematically illustrates a first remote assistance device embedded in the aircraft.

FIG. 2 schematically illustrates the first remote assistance device 150. Consider as an illustration that the pilot of the aircraft 100 communicates with the air traffic control center ATC 142 via the communication 112.

The first remote assistance device 150 comprises an input-output interface 211 for receiving audio signals, typically voice signals, originating from the communication 112. When several communications are active simultaneously with the air traffic control center ATC 142, the audio signals from these communications are mixed together by a dedicated device of the cockpit then supplied via the input-output interface 211.

Furthermore, the first remote assistance device 150 is arranged and configured to transmit via the input-output interface 211 audio signals received from a microphone 151 with which the cockpit is equipped. The microphone 151 is intended more particularly for the use of the pilot, and it can be a microphone fixed to a bulkhead of the cockpit, or a microphone arranged on a support intended to be worn by the pilot or incorporated in an oxygen mask intended for the pilot. The first remote assistance device 150 comprises an input-output interface 201 for receiving these audio signals from the microphone 151. Furthermore, the first remote assistance device 150 comprises an input-output interface 222 for receiving audio signals, typically voice signals, originating from the communication 111 (and therefore from the remote assistance center 141).

The first remote assistance device 150 comprises a first mixer. The first mixer is composed of or comprises a first mixer configured to perform a first mixing, and thus superimpose, the audio signals originating from the input-output interface 211 and the audio signals originating from the input-output interface 222. The first remote assistance device 150 is thus arranged to supply, via the input-output interface 201, the result of the first mixing. Thus, using one or more loudspeakers 152 arranged in the cockpit, the pilot of the aircraft 100 hears the voice communications which are addressed to him or her by the operator posted in the remote assistance center 141 and by the air traffic control center ATC 142. They can, here, be general broadcasting loudspeakers which are mounted on a bulkhead or the ceiling of the cockpit.

The first remote assistance device 150 also comprises a second mixer. The second mixer is composed of or comprises a second mixer configured to perform a second mixing, and thus superimpose, the audio signals originating from the input-output interface 211 and the audio signals originating from the input-output interface 201. The first remote assistance device 150 is thus arranged to supply, via the input-output interface 222, the result of the second mixing. Thus, the operator posted in the remote assistance center 141 receives the voice communications which are addressed to him or her by the pilot of the aircraft 100, as well as the voice communications between the pilot of the aircraft 100 and the air traffic control center ATC 142.

The first remote assistance device 150 also comprises an input interface 223 for receiving data, and in particular commands, originating from the communication 111. The first remote assistance device 150 also comprises an output interface 212 via which to relay the commands received via the input interface 223. The first remote assistance device 150 thus comprises a command relay, for example switchers or hardware or software switches, for relaying the commands received via the communication 111 to devices of the aircraft 100. Thus, the operator posted in the remote assistance center 141 can remotely control (for example configure) devices of the aircraft 100. The command content concerned is addressed hereinbelow in relation to FIG. 3.

The first remote assistance device 150 also preferentially comprises an output interface 221 for transmitting data via the communications 111. The first remote assistance device 150 then also comprises an input interface 215 for receiving these data originating from devices of the cockpit, and including for example information on the status and configuration of devices of the aircraft 100 and/or text messages (e.g. of CPDLC (controller pilot data link communications) type) exchanged between the cockpit of the aircraft 100 and the air traffic control center ATC 142. The first remote assistance device 150 then comprises an information relay, for example switchers or hardware or software switches, for relaying such information from the input interface 215 to the output interface 221. Thus, the operator posted in the remote assistance center 141 receives such information in addition to the voice communications.

The first remote assistance device 150 can also comprise an input interface 214 for receiving an incoming call indication signal, originating from the communication 112 (or from any other communication established with the air traffic control center ATC 142). The first remote assistance device 150 is then arranged to relay this incoming call indication signal to the output interface 221. This incoming call indication signal is presented to the pilot of the aircraft 100 by a dedicated device of the cockpit, but can, as a variant, be relayed to the pilot by the first remote assistance device 150 using a dedicated output interface.

The first remote assistance device 150 can also comprise an output interface 213 for transmitting a push-to-talk signal PTT, to the air traffic control center ATC 142. This push-to-talk signal PTT is previously received via the input-output interface 222 originating from the communication 111 and is thus relayed by the first remote assistance device 150.

The first remote assistance device 150 can also comprise an output interface 202 for relaying to the pilot an incoming call indication signal received via the input interface 223 originating from the communication 111 (and therefore from the remote assistance center 141).

The first remote assistance device 150 can also comprise an input interface 203 for receiving a signal requesting contact with the remote assistance center 141. This contact request signal emanates from the pilot of the aircraft 100 through, for example, a dedicated button. The first remote assistance device 150 is then arranged to relay this contact request signal to the output interface 221.

The first remote assistance device 150 can also comprise an input interface 204 for receiving a remote assistance activation signal. This remote assistance activation signal emanates from the pilot of the aircraft 100 through, for example, a dedicated button. This remote assistance activation signal can, as a variant, be triggered by a predefined event, such as, for example, the occurrence of a predefined alarm on a device of the cockpit. The first remote assistance device 150 then comprises an activator arranged and configured to activate at least the abovementioned mixings and relaying of commands, on detection of this remote assistance activation signal. The activator consists of or comprise a detector of presence of the remote assistance activation signal and a generator of activation signals for the abovementioned first mixing, second mixing and relay. In the absence of this remote assistance activation signal, the first remote assistance device 150 comprises a propagator, for example switchers or hardware or software switches, arranged and configured to simply connect the input-output interfaces 201 and 211, so as to allow the voice communications between the cockpit and the air traffic control center ATC 142. Any command received via the remote assistance center 141 is then disregarded by the first remote assistance device 150. Note however that the first remote assistance device 150 preferentially maintains the relaying, via the output interface 202, of any incoming call indication signal received via the input interface 223 originating from the communication 111. That in particular allows the remote assistance center 141 to signal to the pilot of the aircraft 100 that the remote assistance center 141 wants the remote assistance to be activated.

Figure 3:
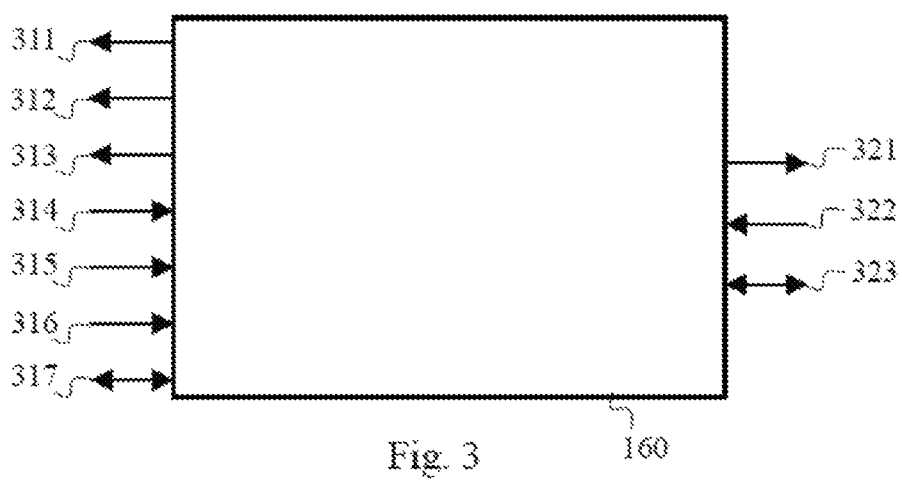
FIG. 3 schematically illustrates a second remote assistance device installed in a site on the ground.

FIG. 3 schematically illustrates the second remote assistance device 160 installed in the remote assistance center 141. The second remote assistance device 160 is a signal formatting device.

The second remote assistance device 160 comprises an input-output interface 317 for receiving audio signals originating from a microphone with which the remote assistance center 141 is equipped (more particularly with which operator posted therein is equipped). The second remote assistance device 160 also comprises an input-output interface 323 for relaying these audio signals to the cockpit of the aircraft 100 via the communication 111. Furthermore, the second remote assistance device 160 is arranged to receive, via the input-output interface 323, audio signals originating from the aircraft 100 via the communication 111, and to relay them via the input-output interface 317.

The second remote assistance device 160 also comprises an input interface 315 for receiving data, and in particular commands, originating from a control member in the remote assistance center 141. Using a user interface of this control member, the operator posted in the remote assistance center 141 defines commands to be transmitted to the cockpit of the aircraft 100. The second remote assistance device 160 also comprises an output interface 321 and is adapted to relay these data and commands to the aircraft 100 via the communication 111 via the output interface 321.

In an embodiment, such commands relate to the parameters for establishing and managing communication between the aircraft 100 and the air traffic control center ATC 142. For example, these commands are from the following:

adjust the sound level of the audio signals received from the air traffic control center ATC 142;

parameterize devices of the cockpit to establish one or more communications with the air traffic control center ATC 142 (carrier frequency, communication channels, call number, etc);

parameterize devices of the cockpit to select in transmission and/or in reception one or more communications from a plurality of communications established with the air traffic control center ATC 142;

accept a call received via a communication established with the air traffic control center ATC 142.

Such commands can also preferentially make it possible to adjust, for the pilot, the sound level of the audio signals received from the remote assistance center 141.

In an embodiment, these commands can relate to other devices of the aircraft 100. In this way, the operator posted in the remote assistance center 141 can for example command the opening and the closing of the door between the cockpit and the cabin of the aircraft 100. Other devices of the aircraft 100 can be controlled according to the same principle.

The second remote assistance device 160 also preferentially comprises an output interface 313 for transmitting data to the control member in the remote assistance center 141. The second remote assistance device 160 then comprises an input interface 322 for receiving these data originating from the aircraft 100 via the communication 111. Such data are for example information on the status and configuration of devices of the aircraft 100 and/or text messages (e.g. of CPDLC type) exchanged between the cockpit of the aircraft 100 and the air traffic control center ATC 142. Thus, the operator posted in the remote assistance center 141 can benefit from such information, for example displayed on the user interface of the control member, in addition to the voice communications between the aircraft 100 and the air traffic control center ATC 142.

The second remote assistance device 160 can also comprise an output interface 311 for transmitting an incoming call indication signal. This incoming call indication signal emanates from the pilot of the aircraft 100 and is received via the communication 111 via the input interface 322 and is thus relayed by the second remote assistance device 160 via the output interface 311 to the control member in the remote assistance center 141.

The second remote assistance device 160 can also comprise an output interface 312 for transmitting another incoming call indication signal. This other incoming call indication signal emanates from the air traffic control center ATC 142 and is received, through the relaying performed by the first remote assistance device 150, via the communication 111 by the input interface 322.

The second remote assistance device 160 can also comprise an input interface 314 for receiving an incoming call indication signal. This incoming call indication signal is received from the control member in the remote assistance center 141. The second remote assistance device 160 is then arranged to relay this incoming call indication signal via the output interface 321 to the aircraft 100 via the communication 111.

The second remote assistance device 160 can also comprise an input interface 316 for receiving a push-to-talk signal PTT originating from the control member in the remote assistance center 141. The second remote assistance device 160 is then arranged to relay this push-to-talk signal PTT to the communication 111 via the input-output interface 323. Thus, the second remote assistance device 160 is arranged to insert this push-to-talk signal PTT into the audio signals relayed from the input-output interface 317 to the input-output interface 323. That makes it possible to ensure that, in reception, the interpreting of this signal can be performed in synchronism with the audio signals.

Figure 4:
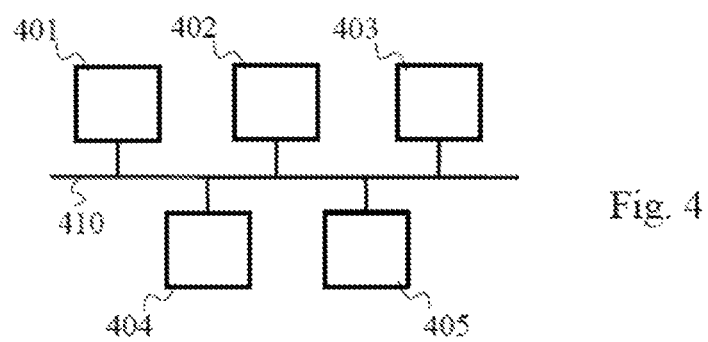
FIG. 4 schematically illustrates an example of hardware architecture of the first remote assistance device embedded in the aircraft, in an embodiment.

FIG. 4 schematically illustrates an example of hardware architecture of the first remote assistance device 150 embedded in the aircraft 100, in an embodiment.

The first remote assistance device 150 thus comprises, linked by a communication bus 410: a processor CPU (central processing unit) 401; a random access memory RAM 402; read-only memory ROM 403, or a flash memory; a storage unit 404, such as a hard disc drive HDD, or a reader of storage media, such as an SD (secure digital) card reader; a set of inputs-outputs 405 as previously described in relation to FIG. 2.

The processor CPU 401 is capable of executing instructions loaded into the RAM memory 402 from the ROM memory 403 or from the flash memory, or from an external memory, or from a storage medium (such as an SD card), or from a communication network. When the first remote assistance device 150 is powered up, the processor CPU 401 is capable of reading instructions from the RAM memory 402 and of executing them. These instructions form a computer program causing the implementation, by the processor CPU 401, of all or part of the algorithm and of the steps described hereinbelow in relation to FIG. 7.

All or part of the algorithm and of the steps described hereinbelow in relation to FIG. 7 can thus be implemented in software form through execution of a set of instructions by a programmable machine, for example a DSP (digital signal processor) or a microcontroller, or be implemented in hardware form by a machine or a dedicated component, for example an FPGA (field-programmable gate array) or ASIC (application-specific integrated circuit) component. Generally, the first remote assistance device 150 comprises electronic circuitry adapted to implement, in software and/or hardware form, the algorithm and the steps described hereinbelow in relation to FIG. 7.

It should be noted that the second remote assistance device 160 can be constructed on one and the same hardware architecture basis.

Thus, the example of modular architecture presented hereinbelow in relation to FIG. 5, as well as the example of modular architecture presented hereinbelow in relation to FIG. 6, can be implemented in software form through execution of a set of instructions by a programmable machine, for example a DSP or a microcontroller, or be implemented in hardware form by a machine or a dedicated component, for example an FPGA or ASIC component. And, more particularly, the abovementioned mixers, relay, activator and propagator can thus take the form of software or hardware modules.

Figure 5:
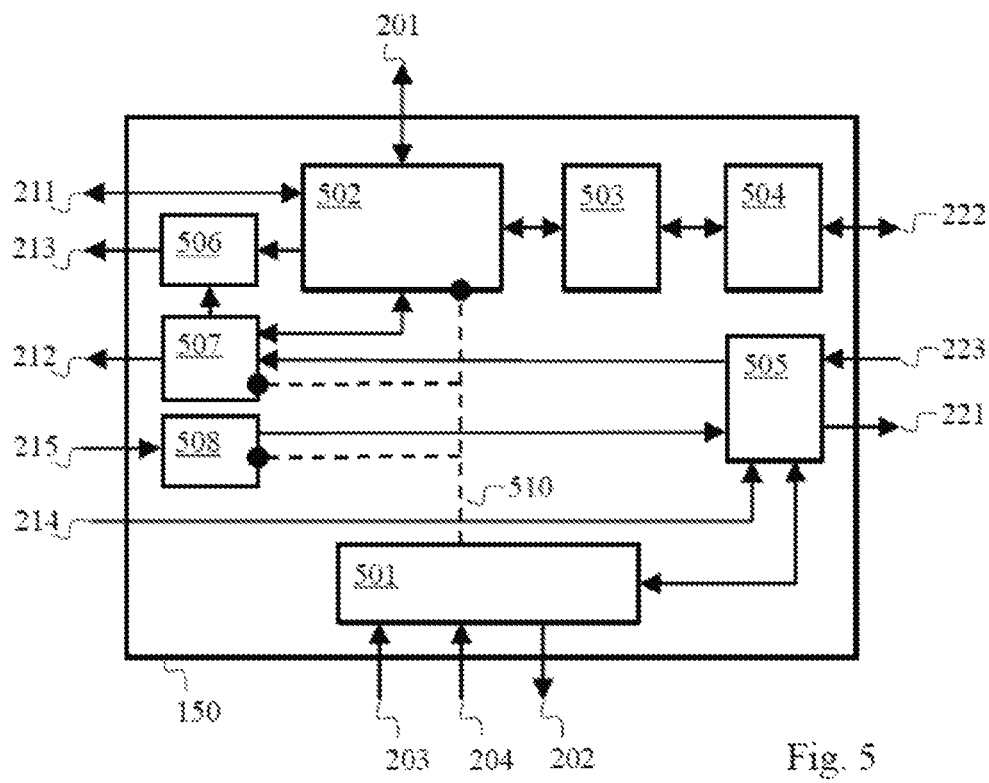
FIG. 5 schematically illustrates an example of modular architecture of the first remote assistance device embedded in the aircraft, in an embodiment.

FIG. 5 schematically illustrates an example of modular architecture of the first remote assistance device 150, in an embodiment.

The first remote assistance device 150 then comprises a selection and mixing module 502, which includes the abovementioned first and second mixers. The selection and mixing module 502 mixes the audio signals from the input-output interfaces 201, 211 and 222, as described in relation to FIG. 2. The audio signals can be digital signals. When the audio signals exchanged by the input-output interfaces 201 and 211 are analogue signals, the first remote assistance device 150 comprises an audio encoding and decoding module 503 making it possible to perform an analogue-digital conversion in order to be able to exchange the audio signals via the communication 111.

The first remote assistance device 150 preferentially comprises an encryption and decryption module 504 intended for the digital audio signals to secure their transmission via the communication 111.

The first remote assistance device 150 also comprises a command decoding module 507, connected to the output interface 212. The command decoding module 507 is configured to interpret each command received via the communication 111. When the first remote assistance device 150 is adapted to receive commands originating from the remote assistance center 141 for selection in transmission and/or in reception of one or more communications out of a plurality of communications established with the air traffic control center ATC 142, the command decoding module 507 is connected to the selection and mixing module 502 in order to have the selection commands received via the communication 111 applied.

The first remote assistance device 150 also preferentially comprises a mailbox module 508 connected to the input interface 215. The mailbox module 508 is configured to temporarily store, before transmission via the communication 111, data originating from devices of the cockpit, for example information on the status and configuration of devices of the aircraft 100 and/or text messages (e.g. of CPDLC type) exchanged between the cockpit of the aircraft 100 and the air traffic control center ATC 142.

The first remote assistance device 150 preferentially comprises an encryption and decryption module 505 intended for the data and commands exchanged via the input 223 and output 221 interfaces, in order to secure their transmission via the communication 111.

The first remote assistance device 150 also preferentially comprises a push-to-talk PTT decoding module 506 connected to the output interface 213. The push-to-talk PTT decoding module 506 is adapted to deliver, to the output interface 213, each push-to-talk signal PTT inserted into the audio signals received via the input-output interface 222. The activation and the deactivation of this push-to-talk PTT decoding module 506 are performed by the command decoding module 507 based on a selection in transmission of a communication with the air traffic control center ATC 142 which relies on a conversation method requiring a button to be pressed to switch from a reception mode to a transmission mode.

The first remote assistance device 150 also preferentially comprises a module 501 for managing interfacing with the pilot, which manages the output interface 202 and the input interfaces 203 and 204. When no remote assistance activation signal is present on the input interface 204, the module 501 managing interfacing with the pilot deactivates, through an activation line 510, the command decoding module 507 and the mailbox module 508. Furthermore, the module 501 for managing interfacing with the pilot switches, by virtue of the activation line 510, the selection and mixing module 502 to a restricted mode in which only the input-output interfaces 201 and 211 are connected. The abovementioned first and second mixers are thus deactivated, as is the relaying of commands. The remote assistance via the communication 111 is thus deactivated, but the voice communications between the cockpit and the air traffic control center ATC 142 are maintained.

Figure 6:
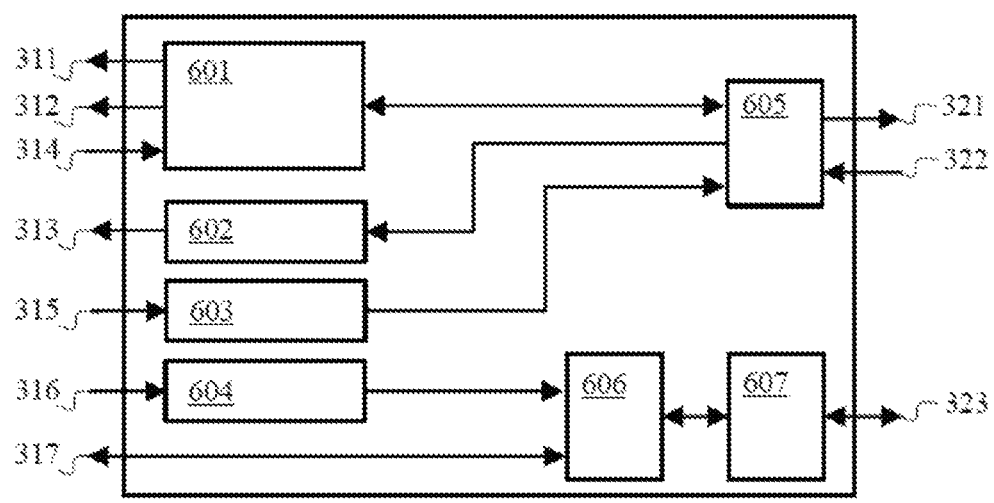
FIG. 6 schematically illustrates an example of modular architecture of the second remote assistance device installed on a site on the ground, in an embodiment.

FIG. 6 schematically illustrates an example of modular architecture of the second remote assistance device 160, in an embodiment.

The second remote assistance device 160 then comprises a command management module 603, which manages the interconnection of the input interface 315 with the communication 111, namely through the input 322 and output 321 interfaces.

The second remote assistance device 160 also preferentially comprises a call management module 601, which manages the interconnection of the input interface 314 and of the output interfaces 311 and 312 with the communication 111, namely through the input 322 and output 321 interfaces.

The second remote assistance device 160 also preferentially comprises a mailbox module 602 configured to temporarily store, after reception via the communication 111 and before transmission via the output interface 313, data originating from devices of the cockpit, for example information on the status and configuration of devices of the aircraft 100 and/or text messages (e.g. of CPDLC type) exchanged between the cockpit of the aircraft 100 and the air traffic control center ATC 142.

The second remote assistance device 160 preferentially comprises an encryption and decryption module 605 intended for the data and commands exchanged through the input 322 and output 321 interfaces, in order to secure their transmission via the communication 111.

As already indicated, the second remote assistance device 160 ensures the interconnection between the input-output interfaces 317 and 323. The audio signals can be digital signals. When the audio signals exchanged via the input-output interface 317 are analogue signals, the second remote assistance device 160 comprises an audio encoding and decoding module 606 making it possible to perform an analogue-digital conversion in order to be able to exchange the audio signals via the communication 111.

The second remote assistance device 160 also preferentially comprises an encryption and decryption module 607 intended for the digital audio signals to secure their transmission via the communication 111.

The second remote assistance device 160 also preferentially comprises a push-to-talk PTT encoding module 604 connected to the input interface 316. The second remote assistance device 160 is arranged to insert the output of the push-to-talk PTT encoding module 604 into the audio signals transmitted via the input-output interface 323, for example through the audio encoding and decoding module 606.

Figure 7:
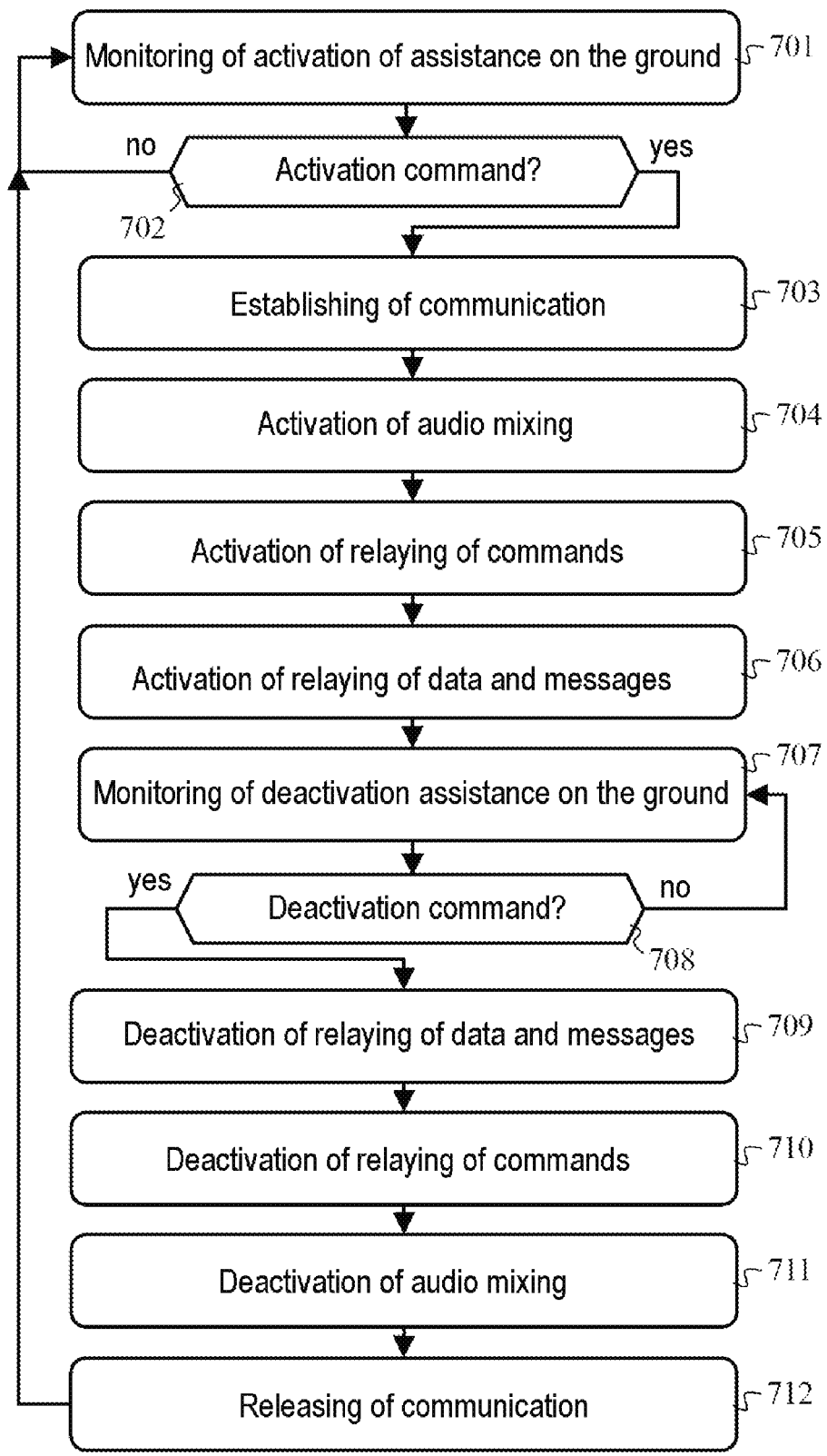
FIG. 7 schematically illustrates a flow diagram of an algorithm implemented by the first remote assistance device embedded in the aircraft.

FIG. 7 schematically illustrates a flow diagram of an algorithm implemented by the first remote assistance device 150.

In a step 701, the first remote assistance device 150 performs a monitoring of activation of assistance on the ground. In other words, the first remote assistance device 150 monitors for the possible presence of remote assistance activation signal over the input interface 204.

In a step 702, the first remote assistance device 150 checks whether an activation command is received, by detection of a possible appearance of the remote assistance activation signal. If the check is positive, a step 703 is performed; otherwise, the step 701 is repeated.

In the step 703, the first remote assistance device 150 establishes the communication 111 (if that is not already in place).

In a step 704, the first remote assistance device 150 activates the abovementioned first and second mixers.

In a second step 705, the first remote assistance device 150 activates the relaying of commands likely to be received via the communication 111.

In an optional step 706, the first remote assistance device 150 activates the relaying of data and of messages, as already described.

In a step 707, the first remote assistance device 150 performs a monitoring of deactivation of assistance on the ground. In other words, the first remote assistance device 150 monitors for a possible disappearance of the remote assistance activation signal over the input interface 204.

In a step 708, the first remote assistance device 150 checks whether a deactivation command is received, by detection of a possible disappearance of the remote assistance activation signal. If the check is positive, a step 709 is performed; otherwise, the step 707 is repeated.

In an optional step 709, the first remote assistance device 150 deactivates the relaying of data and of messages. It is the reverse operation of the step 706.

In a step 710, the first remote assistance device 150 deactivates the relaying of commands. This is the reverse operation of the step 705.

In a step 711, the first remote assistance device 150 deactivates the abovementioned first and second mixers, a relaying between the input-output interfaces 201 and 211 being however ensured to allow the pilot of the aircraft 100 and the air traffic control center ATC 142 to converse. This is the reverse operation of the step 705.

In the step 712, the first remote assistance device 150 releases the communication 111. The first remote assistance device 150 can, as a variant, leave the communication 111 in place, for example to allow the operator posted in the remote assistance center 141 to make contact with the pilot of the aircraft 100. The step 701 is then repeated.

It can be noted in light of the above description that the first remote assistance device 150 can easily be inserted into the current communication architecture of aircraft, without modifying the existing communication operations and protocols between the aircraft and the air traffic control centers.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A remote assistance device configured to be embedded in an aircraft having at least a first communication link with an air traffic control center, a cockpit of the aircraft comprising at least one loudspeaker and one microphone for a pilot of the aircraft, the remote assistance device comprising:
   a communicator configured for establishing a second communication link with a remote assistance center;
   a first mixer configured for performing a first mixing of audio signals originating from the first communication link and the second communication link, wherein the first mixer is further configured for transmitting a result of the first mixing to the at least one loudspeaker;
   a second mixer configured for performing a second mixing of audio signals originating from the first communication link and the microphone, wherein the second mixer is further configured for transmitting a result of the second mixing to the second communication link; and
   a command relay configured for relaying commands received via the second communication link to various devices of the aircraft;
   wherein the commands comprise, at least, a command to adjust a sound level of audio signals received from the air traffic control center.

2. The remote assistance device according to claim 1, wherein the commands additionally comprise one or more of the following:
   a command to parameterize devices of the cockpit to establish one or more communications with the air traffic control center;
   a command to parameterize devices of the cockpit to select in transmission and/or in reception one or more communications from a plurality of communications established with the air traffic control center; and
   a command to accept a call received via a communication established with the air traffic control center.

3. The remote assistance device according to claim 2, wherein the commands further comprise:
   a command to open or close a door between the cockpit and the cabin of the aircraft.

4. The remote assistance device according to claim 1, further comprising: an interface for receiving a remote assistance activation signal;
   an activation circuit; and
   a propagator comprising a transmitter;
   wherein, upon receiving a remote assistance activation signal, the activation circuit is configured to activate at least the first and second mixings and the relaying of commands; and
   wherein the propagator is configured to transmit, using the transmitter, the audio signals originating from the first communication link to the at least one loudspeaker and the audio signals originating from the microphone to the first communication link when the interface has not received the remote assistance activation signal.

5. The remote assistance device according to claim 1, also comprising an information relay configured to relay to the second communication link information on status and configuration of devices of the aircraft and/or text messages exchanged between the cockpit and the air traffic control center.

6. The remote assistance device according to claim 1, wherein the second communication link is a satellite communication link.

7. A system comprising a first remote assistance device according to claim 1, and a second remote assistance device installed in the remote assistance center, the first and second remote assistance devices configured to communicate via the second communication link to allow an operator posted in the remote assistance center to remotely control devices of the aircraft, to communicate by voice with the cockpit of the aircraft and to receive voice exchanges between the cockpit of the aircraft and the air traffic control center.

8. An aircraft having at least one first communication link with an air traffic control center, the cockpit of the aircraft comprising at least one loudspeaker and one microphone for the pilot of the aircraft, the aircraft also comprising a remote assistance device according to claim 1.

9. A method implemented by a remote assistance device embedded in an aircraft having at least one first communication link with an air traffic control center, a cockpit of the aircraft comprising at least one loudspeaker and one microphone for a pilot of the aircraft, the method comprising:

establishing a second communication link between the remote assistance device and a remote assistance center;

performing a first mixing of audio signals originating from the first communication link and audio signals originating from the second communication link, and transmitting a result of the first mixing to the at least one loudspeaker;

performing a second mixing of audio signals originating from the first communication link and audio signals originating from the microphone, and transmitting a result of the second mixing to the second communication link; and relaying commands received via the second communication link to various devices of the aircraft;

wherein the commands comprise, at least, a command to adjust a sound level of audio signals received from the air traffic control center.

* * * * *